United States Patent
Chauvin et al.

(10) Patent No.: US 8,868,380 B2
(45) Date of Patent: Oct. 21, 2014

(54) PROCESS OF UPDATING A STATUS OF RELATION BETWEEN OBJECTS IN A SYSTEM OF COMPUTER-AIDED DESIGN OF OBJECTS

(75) Inventors: Frédéric Chauvin, Villepreux (FR); Gabriel Fournier, Les Clayes-sous-bois (FR); Alexandre Laloi, Rueil-Nalnaison (FR)

(73) Assignee: Dassault Systems, Velizy Villacoublay (FR)

(*) Notice: Subject to any disclaimer, the term of this patent is extended or adjusted under 35 U.S.C. 154(b) by 0 days.

(21) Appl. No.: 12/791,742

(22) Filed: Jun. 1, 2010

(65) Prior Publication Data

US 2010/0312526 A1    Dec. 9, 2010

(30) Foreign Application Priority Data

Jun. 5, 2009    (EP) .................................... 09290415

(51) Int. Cl.
G06G 7/48    (2006.01)
G06F 17/50    (2006.01)

(52) U.S. Cl.
CPC ............ *G06F 17/50* (2013.01); *G06F 2217/06* (2013.01)
USPC ................................................ 703/1; 700/98

(58) Field of Classification Search
CPC .. G06F 17/50; G06F 2217/02; G06F 2217/06
USPC .................... 703/1, 7–8; 700/97–98
See application file for complete search history.

(56) References Cited

U.S. PATENT DOCUMENTS

| 7,127,308 B2 * | 10/2006 | Bigelow ........................... 703/1 |
| 8,195,322 B2 * | 6/2012 | Rutka ........................... 700/103 |
| 8,249,833 B2 * | 8/2012 | Okuwaki et al. .................. 703/1 |

FOREIGN PATENT DOCUMENTS

| CN | 101226559 | 7/2008 |
| JP | 08-063492 | 3/1996 |
| JP | 09-128416 | 5/1997 |
| JP | 2006-155601 | 6/2006 |
| JP | 2007-257082 | 10/2007 |
| WO | WO 2004083983 | 9/2004 |

OTHER PUBLICATIONS

Sutherlan., University of Cambridge., "Sketchpad: A Man-Macnine Graphical Communicaiton System". Sep. 2003., 149 Pages.*
DeMartino, T., "A Multiple-View Cad Representation for Product Modeling," Shape Modeling and Applications, International Conference, 78-84 (1997).*
Sutherland, I. E., "Sketchpad a Man-Machine Graphical Communication System," Proceedings of the Spring Joint Computer Conference, 23:329-346 (1963).*

(Continued)

*Primary Examiner* — Eunhee Kim
(74) *Attorney, Agent, or Firm* — Hamilton, Brook, Smith & Reynolds, P.C.

(57) ABSTRACT

A process updates a status of relation between objects in a system of computer-aided design, for subsequent analysis of status of relation. The process identifies
  a set of data of a group of objects, preferably a pair of objects;
  a method of computation of relations between objects; and
  an expected relation of executing the method identified using the set.
Next the process executes the method using the set of data to compute a relation. A comparison step compares the expected relation with the computed relation. The process updates a status of the expected relation based on a result of the comparing step.

18 Claims, 7 Drawing Sheets

(56) References Cited

OTHER PUBLICATIONS

Hidde, A. R., et al., "An AI-based Manufacturer Design Rule Checker and Path Optimizer for PCB Production Preparation and Manufacturing," *Proceedings of the Electronics Manufacturing Symposium*, 11:244-249 (1991).

Hsu, et al., "A Constraint-based Manipulator Toolset for Editing 3D Objects," *Proceedings of the Symposium on Solid Modeling and Applications*, 4:168-180 (1997), Even number pages.

Sutherland, I. E., "Sketchpad a Man-Machine Graphical Communication System," *Proceedings of the Spring Joint Computer Conference*, 23: 329-346 (1963).

European Search Report for EP 09 29 0415, Date of Completion Mar. 3, 2010.

European Search Report for EP 09 29 0415, Date of Completion Nov. 10, 2009.

* cited by examiner

PROCESS OF UPDATING A STATUS OF RELATION BETWEEN OBJECTS IN A SYSTEM OF COMPUTER-AIDED DESIGN OF OBJECTS

RELATED APPLICATION(S)

This application claims priority under 35 U.S.C. §119 or 365 to European Application No. 09290415.0, filed Jun. 5, 2009.

The entire teachings of the above application(s) are incorporated herein by reference.

FIELD OF THE INVENTION

The invention relates to the field of computer programs and systems, and more specifically to a method of computer aided design of a product comprising a set of modeled objects, wherein said objects are for instance linked by constraints and subjected to specifications.

BACKGROUND OF THE INVENTION

Computer-aided techniques are known to include Computer-Aided Design or CAD, which relates to software solutions for authoring product design. Similarly, CAE is an acronym for Computer-Aided Engineering, e.g. it relates to software solutions for simulating the physical behavior of a future product. CAM stands for Computer-Aided Manufacturing and typically includes software solutions for defining manufacturing processes and operations.

A number of systems and programs are offered on the market for the design of objects (or parts) or assemblies of objects, forming a product, such as the one provided by Dassault Systemes under the trademark CATIA. These CAD systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mostly specifications of geometry. Specifically, CAD files contain specifications, from which geometry is generated, which in turn allow for a representation to be generated. Geometry and representation may be stored in a single CAD file or multiple ones. CAD systems include graphic tools for representing the modeled objects to the designers; these tools are dedicated to the display of complex objects—the typical size of a file representing an object in a CAD system being in the range of one Megabyte per part, and an assembly may comprise thousands of parts. A CAD system manages models of objects, which are stored in electronic files.

In computer-aided techniques, the graphical user interface (GUI) plays an important role as regards the efficiency of the technique.

Also known are Product Lifecycle Management (PLM) solutions, which refer to a business strategy that helps companies to share product data, apply common processes, and leverage corporate knowledge for the development of products from conception to the end of their life, across the concept of extended enterprise. By including the actors (company departments, business partners, suppliers, Original Equipment Manufacturers (OEM), and customers), PLM may allow this network to operate as a single entity to conceptualize, design, build, and support products and processes.

Some PLM solutions make it for instance possible to design and develop products by creating digital mockups (a 3D graphical model of a product). The digital product may be first defined and simulated using an appropriate application. Then, the lean digital manufacturing processes may be defined and modeled.

The PLM solutions provided by Dassault Systems (under the trademarks CATIA, ENOVIA and DELMIA) provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Such PLM solutions comprise a relational database of products. The database comprises a set of textual data and relations between the data. Data typically include technical data related to the products said data being ordered in a hierarchy of data and are indexed to be searchable. The data are representative of the modeled objects, which are often modeled products and processes.

Product lifecycle information, including product configuration, process knowledge and resources information are typically intended to be edited in a collaborative way.

Amongst other features, modeling in CAD applications often requires defining not only the geometric objects, but also the functional dependences between the said objects. This is usually achieved with the help of constraints. A constraint (e.g. a geometric constraint) is a relation among geometric objects that should be satisfied. For example, one may require that a first object is located at a given distance (offset) from a second object.

More generally, other types of relations may be created or modified, like interference specifications. Interferences specifications generally encompass clash, contact and clearance specifications. In this respect, it is important to avoid a clash (matter interpenetration) in a designed product. More generally, and depending on the situation, it might also be important to check, during a design session that some parts of the products are:
 in contact
 at a given distance (minimal or range) from another one (also called clearance)
 not clashing with each other.

A known solution to these requirements is to run an interference process once the product is designed. For each couple of parts that are in clash, in contact or that does not satisfies a global clearance value, an interference result is created. An analyst must then study each interference to distinguish expected clashes, contacts or clearances from unexpected ones. In a large product, an interference process is burdensome, time consuming as subjected to abundant errors. Basically, considering a product made of 10,000 parts, the number of interferences varies at least like the number of parts, and possibly like the number of pairs of parts involved (around 50 million here), which illustrates the amount of work required.

Thus, according to the limitations of the known solution discussed above, there is a need for an improved process, allowing to substantially reduce the resource (particularly the time) required for interference process.

SUMMARY OF THE INVENTION

The invention therefore provides a process of updating a status of relation between objects in a system of computer-aided design, for subsequent analysis of status of relation, comprising:
  identifying:
    (i) a set of data of a group of objects, preferably a pair of objects;
    (ii) a method of computation of relations between objects; and
    (iii) an expected relation of executing the method identified using said set of data;
  executing the method using the set of data to compute a relation;
  comparing the expected relation with the computed relation; and
  updating a status of the expected relation based on a result of the comparing step.

The process may comprise one or more of the following features:
  identifying a modified set of data, a computation method and/or an expected relation and repeating the steps of executing, comparing and updating;
  after a step of identifying and prior to a step of executing the method, a step of creating or modifying an engineering intent object, maintaining a logical link between an identified set of data, a computation method and an expected relation;
  after a step of creating or modifying the engineering intent object and prior to a step of executing the method, a step of storing the engineering intent object or a link thereto inside a definition of said group of objects;
  at the step of comparing, the expected relation with the computed relation is carried out according to the engineering intent object;
  a step of displaying a status of an expected relation based on a result of the comparing step;
  prior to the step of identifying, a step of receiving user instructions to define or edit the set of data, the computation method and the expected relation;
  updating interference relations between objects in the system of computer-aided design;
  the steps of identifying, executing, comparing and updating are carried out during a design phase of the objects;
  the steps of identifying, executing, comparing and updating are carried out during a phase of clash analysis of the objects;
  the steps of identifying, executing, comparing and updating are carried out during a design phase of the objects, the process further comprises, during a subsequent phase of clash analysis of the objects, steps of
  identifying:
    (i) a set of data of a group of objects, preferably a pair or objects;
    (ii) a method of computation of relations between objects; and
    (iii) an expected relation of executing the method identified;
  executing the method using the set of data to compute a relation;
  comparing the expected relation with the computed relation; and
  updating a status of the expected relation based on a result of the comparing step;
  a step of comparing comprises generating a comparison result, the comparison result being:
    a first value if an expected relation matches a computed relation;
    a second value if an expected relation does not match a computed relation; or
    a third value if a computed relation cannot be compared with an expected relation;
  a step of declaring a computed relation as a specification.

The invention further concerns a computer program comprising program code means for carrying out all the steps of the process.

The invention also concerns a computerized system comprising program code means for carrying out all the steps of the process.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, showing.

DETAILED DESCRIPTION OF THE INVENTION

A description of example embodiments of the invention follows.

The invention makes it possible to capitalize interference data, preferably a clash, in a computer aided-design system, preferably during the design process itself. A progressive update of interference statuses is implemented, based on prior expectations of interferences. This makes an interference result analysis easier inasmuch as the analysis can be partitioned according to statuses obtained in fine (the end). The invention drastically reduces the number of interferences to be investigated after an interference process analysis. Possibly, the user is allowed to create and/or capture, based on user input or based on a system analysis and suggestion, interference specifications while designing the product. Said specification can be updated based on timely computed interferences, in order to ensure that interference specifications are satisfied. Partitioning the analysis according to final statuses results in that only unspecified interferences or interferences that do not match their specifications will have to be studied. Expected and specified interferences that are not met also have to be studied. The concept of interference can be generalized to relations between objects.

Figure 1:
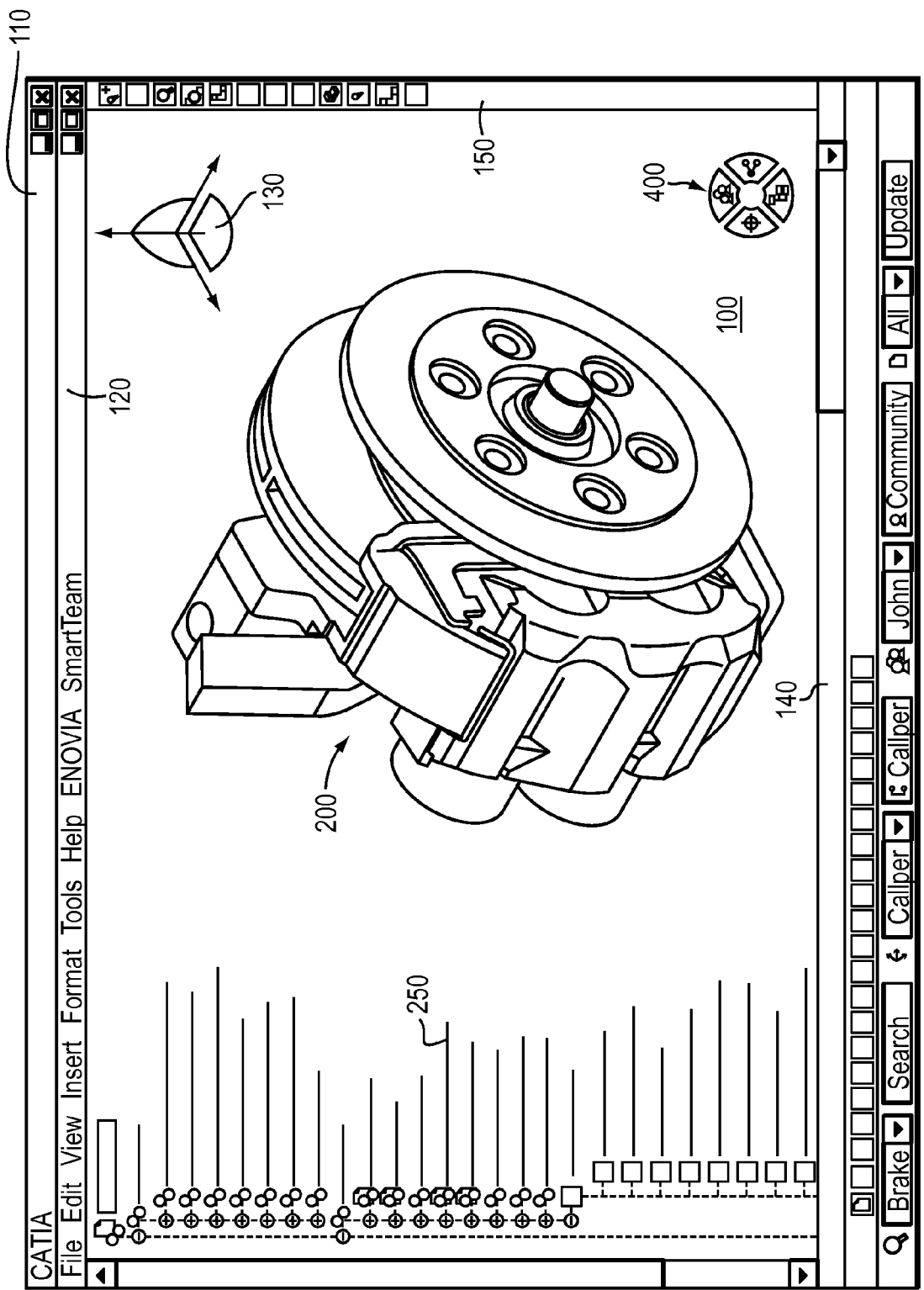
FIG. 1: a graphical interface suited for carrying out steps of the process of the invention.

In reference to FIG. 1: in practice, a user is provided with a graphical user interface (or GUI) such as the one of CATIA.

In reference to FIG. 1, the exemplified graphical user interface (or GUI) 100 may be a typical CAD-like interface, having standard menu bars 110, 120, as well as bottom and side toolbars 140, 150. Such menu bars and toolbars contain a set of user-selectable icons, each icon being associated with one or more operations or functions, as known in the art.

Some of these icons are associated with software tools, adapted for editing and/or working on a modeled product 200 or parts of product 200 such as that displayed in the GUI 100. In the following description, "product", "part", "assembly" and the like may be referred to as "part" for the sake of simplicity. Note that the concept of "part" can in fact be generalized to that of "object", wherein an object can be only a "physical" part of the designed product or, more generally, any software tool participating in the design process (but not necessarily "in" the final product).

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations include the modeling of the punching or the folding of a 3D modeled object displayed on the screen.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130, 400 for example for facilitating 3D orientation of the object, for triggering a simulation of an operation of an edited product or render various attributes of the displayed product 200.

Figure 2A:
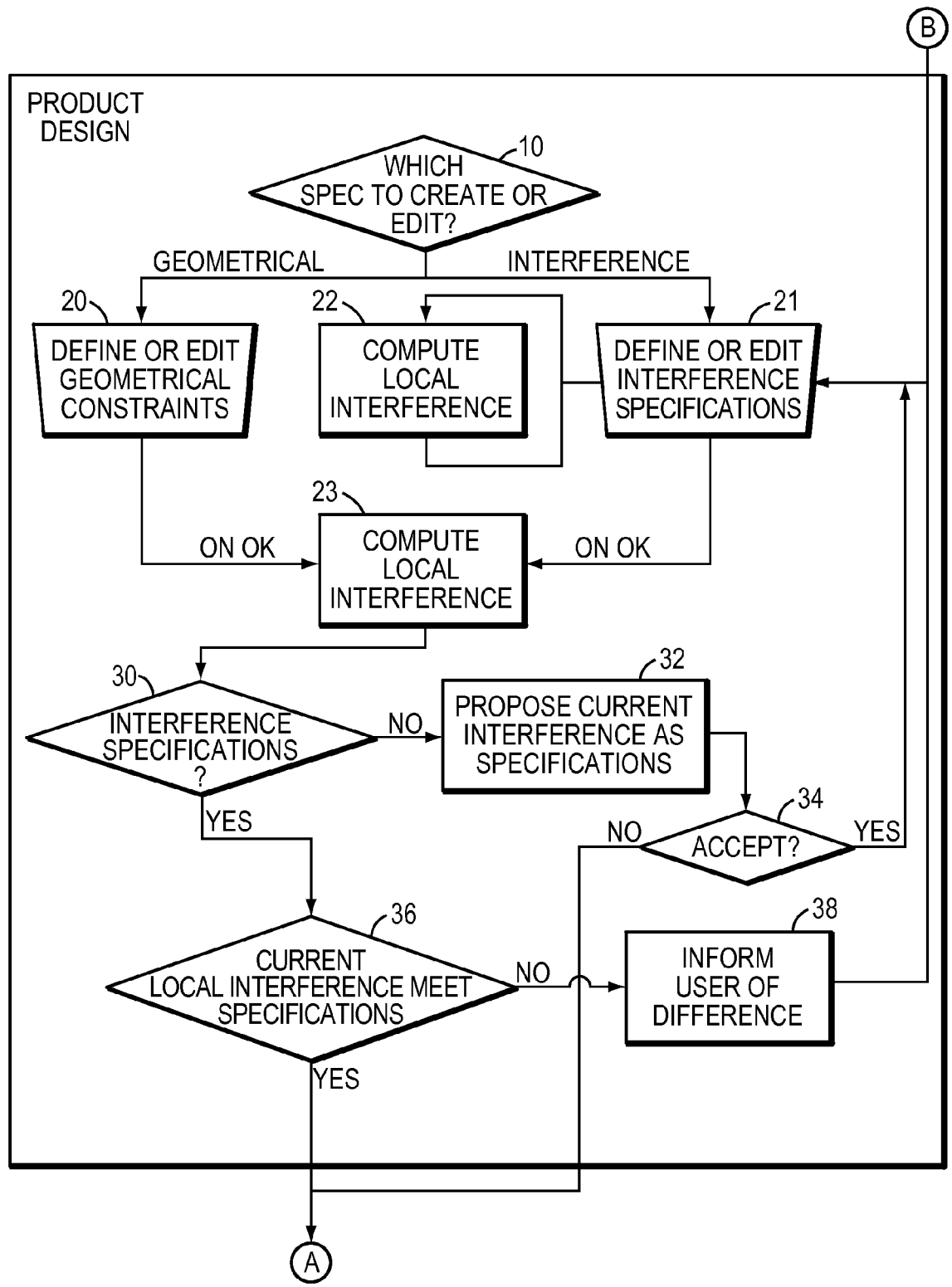
FIG. 2a-2c: a flowchart reflecting a detailed embodiment of the process of the invention.
Figure 2B:
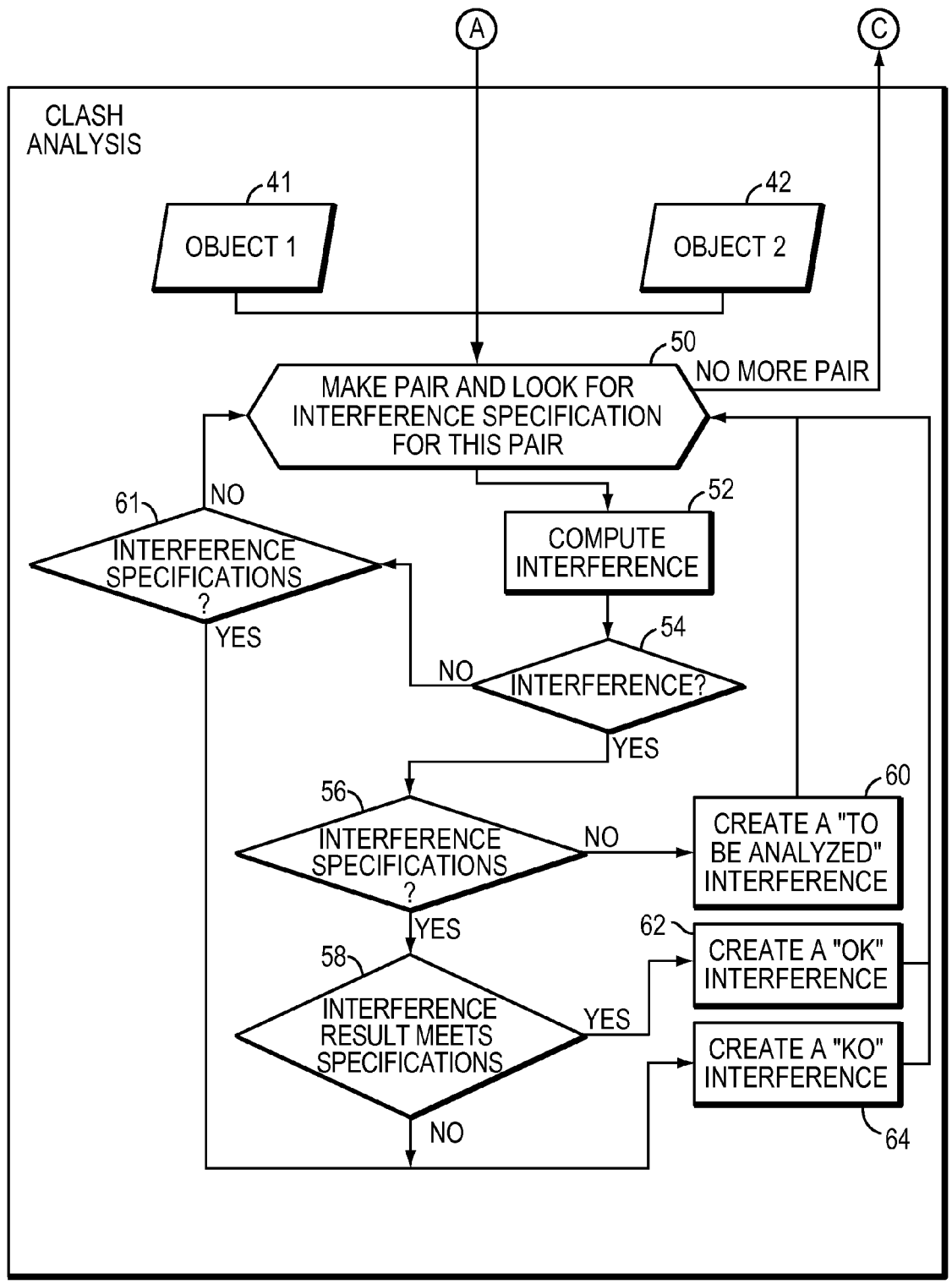
Figure 2C:
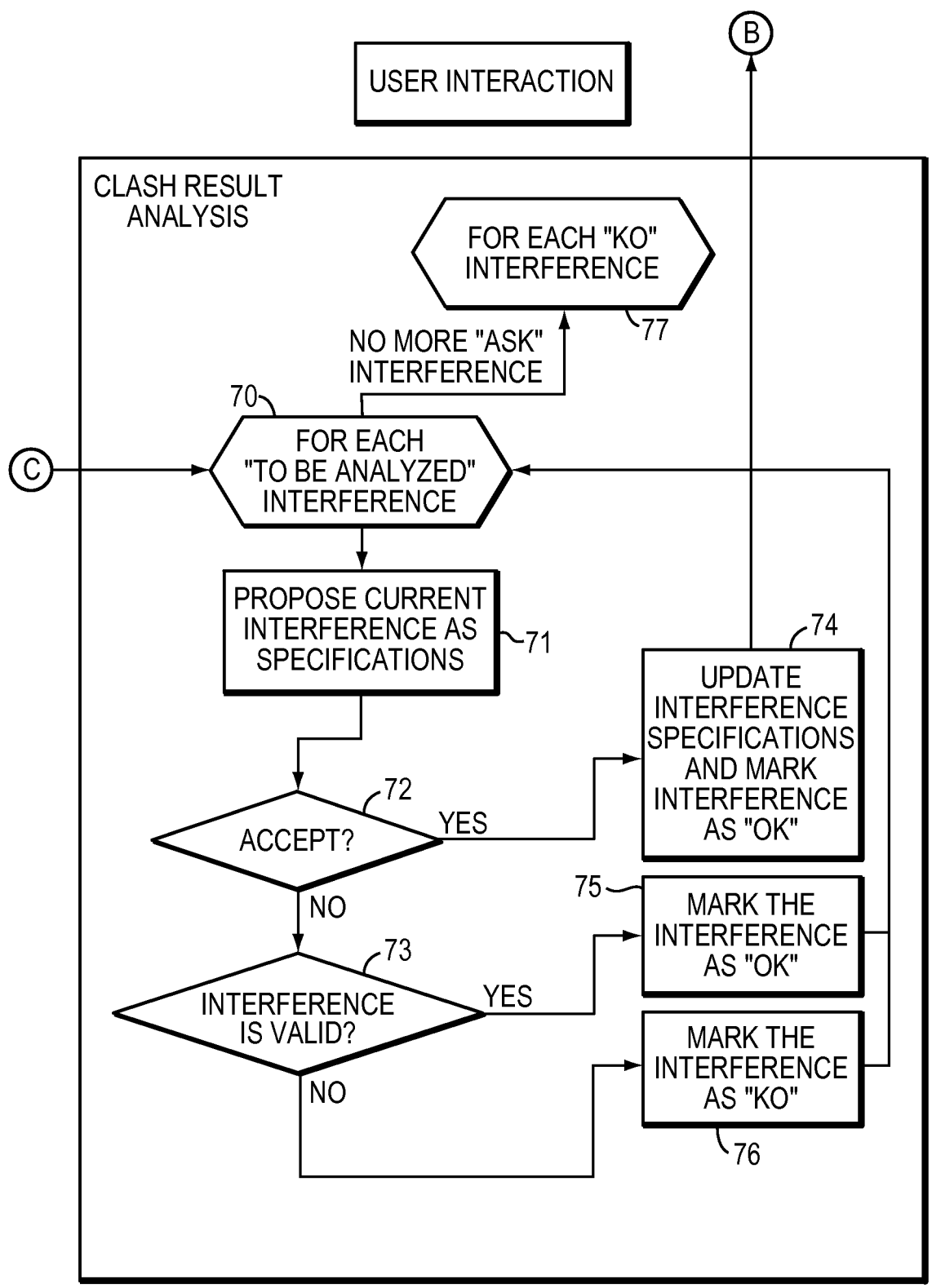
Figure 3:
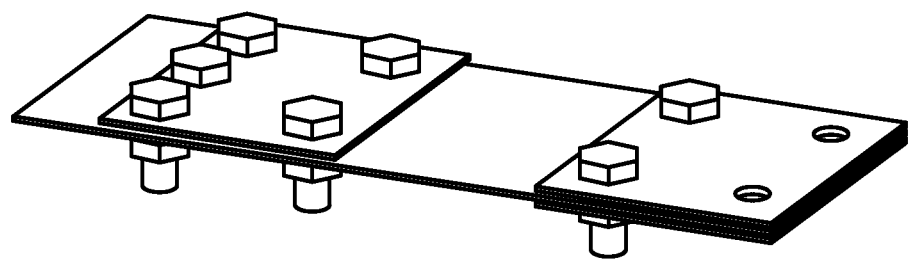
FIG. 3: a system comprising screws and bolts fixing plates.
Figure 4:
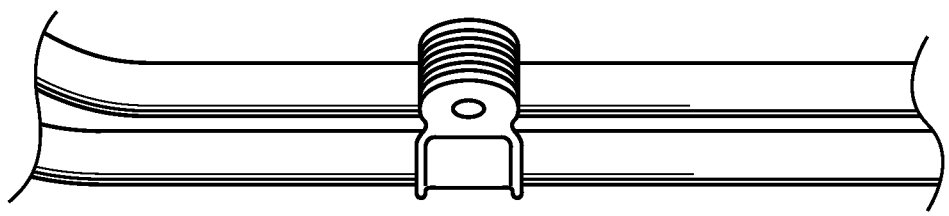
FIG. 4: a fixation and the parts such as pipes it is fixing.
Figure 5:
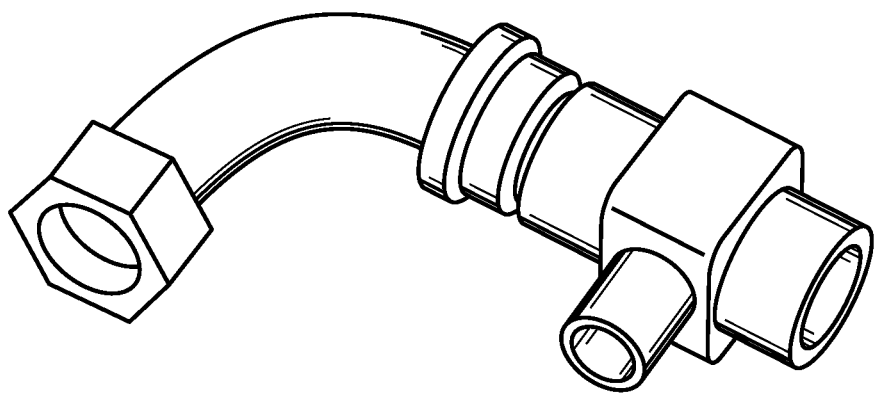
FIG. 5: a pipe linked to an equipment.
Figure 6:
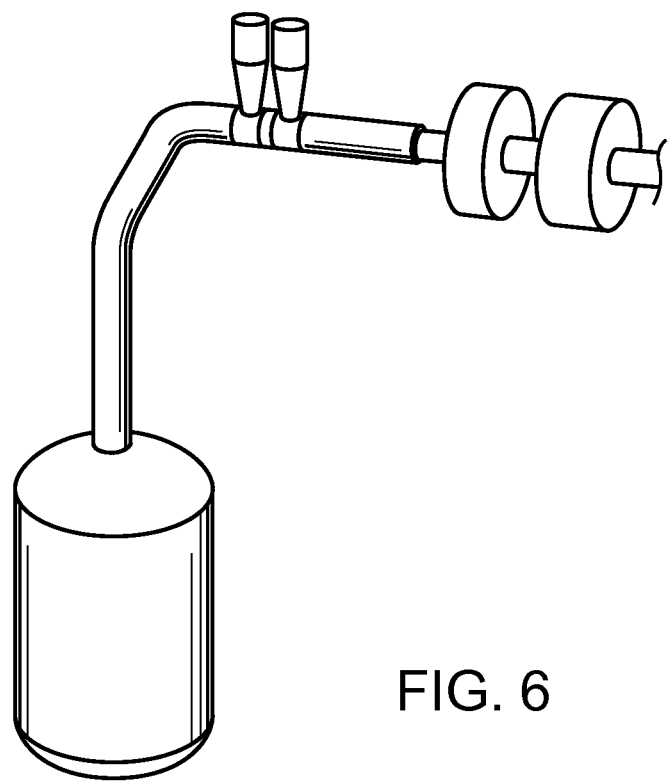
FIG. 6: a pipe and its valve.

FIGS. 2a-2c show a flowchart of an embodiment of the process according to the invention, wherein three blocks are to be seen, pertaining respectively to phases of product design (steps 10-38 in the first block), clash analysis (steps 41-64, second block) and clash result analysis (steps 71-77, third block).

The process of the invention can be carried out during the design process itself, as suggested in step 10 in FIG. 2a, or after (steps 41-64, second block). In all cases, this process makes the post-design analysis easier (steps 71-77, third block).

The process requires identifying relevant specifications for subsequent computation of interferences. This can for example be carried out during the product design. Amongst the specifications identified (step 21) are a specific method of computation of interferences between objects. Data pertaining to the objects in question are identified as well. The specifications further comprise an "expected" relation, that is, an expected result of executing the method using object data as input. In this regards, a relation is here meant as a relation suitable to characterize an interference involving a group of objects such as a pair of objects, a triplet of objects or more objects. Such a relation may hereafter be denoted by "interference", for clarity. For the sake of clarity, the invention will be described with a non-limiting embodiment using a pair of objects.

A user action is preferably involved at the step 21, to define and/or edit interference specifications, that is, when implementing the process of the invention during the design process itself. To this aim, user instructions can be received (step 21), for example via the GUI of FIG. 1.

Accordingly, during the design process, a user can edit or define both geometrical features (like constraints, see step 20 of FIG. 2a) and interference specifications 21, for example using dedicated workbenches in the GUI. Steps of geometrical design may be interlaced with steps of defining or editing interference specifications.

For example, during the design phase, the designer will typically define relative positions, static or kinematics, (step 20) and tolerances between parts. To this aim, the process may comprise an initial step of displaying a GUI of a CAD system, adapted to receive user-instruction for edition of geometrical features and interference specifications. A same object that is used to define the geometrical constraints and tolerances may possibly be used to capture interference specifications. For instance, while specifying a geometrical contact between two parts, the user can add interference specifications ensuring contact of matter. Nevertheless, positioning specifications are not required to define interference specifications. Furthermore, other interference specifications such as required input voltage between a two electrical parts, minimum distance between an electrical and an hydraulic part could be defined elsewhere, in order to be checked during the subsequent clash analysis.

During the same design process, a user can also decide to set a feature that explicitly link two objects or more to one another as being part of the same system (steps 20, 21). This can be done by setting the status of a relation between objects as meeting specifications. In this case, it is not necessary to compute any interference and to compare.

Figure 7:
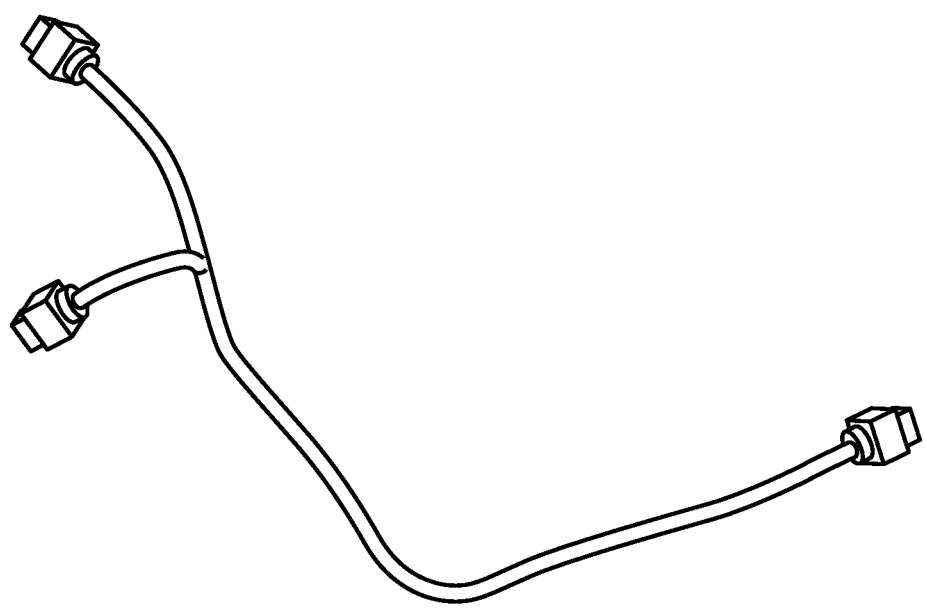
FIG. 7: an electrical harness and its outlets.

A list of examples of couple or more parts that are linked in terms of system are illustrated in FIGS. 3 to 7: a system comprising screws and bolts fixing plates (FIG. 3), a fixation and the parts such as pipes it is fixing (FIG. 4), a pipe linked to an equipment (FIG. 5), a pipe and its valve (FIG. 6), and an electrical harness and its outlets (FIG. 7). The range of this list is infinite and depends on the way the user is working.

It has to be noted that those features can be created automatically by the software application in charge of generating the pipes, valves, harness etc. or manually by the end-user. The automatic creation may appear for example at the time when the user creates the plug and attach it to the harness (FIG. 7); in that case, the electrical application in charge of creating the plug will create the design intent automatically in the system. The aim of those features is that the interference process will take them into account to ignore or set to "OK" the interferences that may be found between the two parts linked together (21, 50, 52). The amount of time saved is easily understandable: as there can be thousands of systems (screw, rivets . . . ), it's those thousands of potential interferences that will not be analyzed by the end-users.

Such specifications (including expected relations or interference) can be seen as engineering connections. An engineering connection may comprise one or more engineering intents. An engineering intent may comprise data identifying the parts involved in the interference, the expected interference results between the parts and a computation method identified by the system. One or more engineering connections may be defined for a same pair of parts. Thus, in an embodiment, an engineering intent object is stored together or in relation with the usual product definition. In practice, in a reference tree structure, children (representing instances of parts in a product) are stored under a parent product reference. Here, an engineering intent object can be stored under a parent reference, which points at children involved.

Alternatively, a pointer to an engineering intent object is stored under the parent reference. Later, the objects in question can easily be retrieved for subsequent interference computations or comparison.

In a variant, an engineering intent object can be stored under a child reference, so as to make easier the management of engineering intent objects with respect to possible child removal.

Once informed of a suitable method of computation, the process may execute the method to compute an interference result, for example by calling all relevant engineering intent objects. This may arise at different points, notably while editing (i.e. creating or modifying) interference specifications (step 22): here the system suggests computing the interference specification being edited (e.g. based on default values). Hence, an expected result can be made available semi-automatically.

Importantly, an interference result can be computed at step 23, upon completion of the editions of the engineering intent. Obviously, said interference computation is preferably local, i.e. restricted to first-neighbor parts. Accordingly, the local interference computation can be regarded as a local clash analysis 22, 23, excepted that said local clash analysis relies on prior expectations of interferences as stored in the available specifications, for example via intent objects. Hence a progressive scheme is implemented, making it easier to analyze possible errors.

For example, a local clash analysis is automatically launched upon completion of edition of geometrical constraints linking two parts. This allows for capturing a current interference result (step 23).

The system may then optionally propose to create (32) or modify (21) a specification based on the current interference result. It is to be understood that the modification of a specification also includes its deletion. Specifications are accordingly capitalized and are available for subsequent computation, i.e. during a global clash analysis.

In practice, after computation of a local interference (step 23), the system checks for the occurrence of an expected interference specification (step 30). If no specification is available yet, the algorithm suggests setting the current interference as a specification to be retained, e.g. in an engineering intent object (steps 32-34). An engineering intent object can thus be created or modified according to a computed interference.

On the contrary, if interference specification already exists 30, the system compares it with the currently computed interference. A comparison result is accordingly generated 36, making it possible to conclude as to whether a current local interference meets the specifications. A corresponding status of the interference specification is derived and updated, if necessary.

Thus, the systems can check whether a current interference match a specification 30 already capitalized, and update an interference status (step 36). If no match is found, the system informs the user accordingly 38, by e.g. displaying a suitable message. Following this, the process may loop back to step 21: the user can for example re-edit, i.e. modify, an interference specification accordingly, or simply be proposed to accept the current interference as an updated specification (38, 21, 23).

Else, if the current local interference meets stored specifications 36, the corresponding engineering intent object is up-to-date and ready for further use during a subsequent phase (i.e. a clash analysis).

Obviously, a tolerance scheme can be applied to check whether a current interference matches stored specifications.

Assuming now that the design phase is over, a clash analysis can begin (second block of FIGS. 2a-2c). Inputs are the following.

First, at step 50, interference specifications pertaining to two groups of objects or, at least, to a pair of objects 41, 42, are identified. Basing a clash analysis on pairs of groups of objects rather than on pairs of objects is usual in the specific field of the clash analysis. The skilled person might however appreciate that the core of the process of the invention is unchanged when applied at the level of a clash analysis: here, data pertaining to at least a pair of objects need be identified.

Note that with respect to corresponding data identified during the design phase, the object data identified during a clash analysis may have been updated during the completion of design process.

In addition, specifications already capitalized (e.g. during the design phase) are identified too. Data relating to objects 41, 42 and specifications can, if necessary, be easily retrieved from engineering intent object as stored during the design phase. Said objects further enclose suitable methods of computation of interference between objects, which are identified as well (step 50).

At step 52: the system can then execute the method using relevant data to compute a current interference. The interference result is here relevant to the pair 41, 42 previously identified.

Compared with the design phase, the algorithm may here possibly include intermediate steps 54, 61, 64. The first intermediate step consists in testing whether interference effectively occurs (step 54). Indeed, not all group pairs might interfere. In case no interference arises effectively, it is checked whether interference specification have already been stored during product design, at step 61. Logically, a conflict arises if specification already exists, in which case a status of the interference is updated at step 64 (here marked as a 'KO' interference). Else, if no specification exists, the algorithm goes back to step 50.

Next, in case an interference arises effectively (branch 54-56), it is checked whether the current interference match an available interference specification (steps 56, 58), just as in steps 30, 36 in the design phase. A corresponding status is accordingly updated, as depicted in step 62 or 64 ('OK' means a match, 'KO' means a discrepancy).

There are situations where no interference specification is available, for instance if no specification could be previously computed or edited by a user. In this case, a specific value replaces the specification (that is, the expected interference). When identified, the said specific value informs the system that no comparison is possible. Therefore, the current interference is marked as 'to be analyzed'.

This amounts to generating comparison results depending on whether:
  a computed relation can be compared with an expected relation; and
  the expected relation does or does not match the computed relation.

The algorithm proceeds similarly for each pairs 41, 42, until completing all pairs. At this point, relevant outputs are available for analysis of the clash result (FIGS. 2a-2c, third block).

Note that a suitable wizard can be displayed in the GUI in order to assist the designer/analyst at each macro-step of FIGS. 2a-2c (product design, clash analysis and/or clash result analysis).

When all pairs are completed, the system may for example first consider each interference marked as 'to be analyzed', step 70. For instance, it may be proposed to the user, at step 71, to declare a current interference (i.e. computed at step 52 and then marked as 'to be analyzed') as a specification. This is all the more useful inasmuch as that no specification was initially detected at steps 56, 60.

Now, upon acceptance by the user 72, the specification is updated and marked as 'OK', step 74. On the contrary, the user may refuse to declare the current interference as a specification. In this case, the user may possibly be asked (step 73) to provide a status 75, 76 as to the validity of the current interference 'to be analyzed'.

The loop continues until all interferences 'to be analyzed' are processed. At this point, the system may provide to the user a tool or wizard suitable for analyzing interferences marked as 'KO', just as known in the prior art.

Be it during the design phase, the clash analysis or the result analysis, the process takes benefit of prior expectations of interference, i.e. it compares a current interference result to a previously stored expectation. An interference status is thus progressively updated, allowing for partitioning a final analysis according to the obtained statuses. A suitable interface or wizard may accordingly be provided. In particular, not all interferences obtained according to the invention need be analyzed a priori. Indeed, inspection of interferences marked as 'OK' might be skipped. This represents a substantial part of interferences in practice.

In comparison, the known prior art method described in introduction ignores the following steps:
 during the design phase: the steps 21, 22, 23, 30, 32, 34, 36, 38;
 during the clash analysis: the steps 56, 58 and 61; and
 during the clash analysis: the steps 71, 72, and 74.

In particular, the known clash analysis does not rely on prior expectations of interference and on progressive update.

It should be stressed that the invention may apply to several technical fields in which it may be useful to take advantage of knowledge. It thus should be understood that interference specifications are not limited to geometrical relations nor just to physical interference between parts.

For instance, in hydraulics field, the invention may apply to identify a fluid that would not be suitable in a fluid power system. In electrical field, the invention may apply to identify a plug that would be too closed to a water source. In assembly design, the invention may apply to ensure that the use of a specific screw does match with a wood part.

Global rules may be defined based on the attributes of a part or a context in accordance with the related specifications.

As an example of embodiment, the process of the invention is implemented in a computer network comprising user computers and one or more product data management (PDM) system. The user computers are in communication with the PDM system. The PDM system may for example be located at a backbone of the network. The PDM system allows for the management of numerous documents, relations and data, possibly hierarchically interrelated. Such a PDM system is equipped with a product lifecycle database having data related to modeled products, assemblies and product parts, which are likely to be edited by a designer. A plurality of users may thus work in a collaborative way, on different parts/products/assemblies.

Referring back to FIG. 1, the GUI 100 is for instance adapted for allowing access to the product lifecycle database, either on users request or as a background task, in contrast with usual CAD/CAM interfaces. Thus, in operation, a user who wishes to access the database does not have to pass from a first CAD window to a PDM window (for example by minimizing the first window and maximizing the second window), adapted for querying the database, and then go back to the CAD/CAM window. Such window switching operations, frequently carried out by designers, are time consuming and particularly inappropriate in the field of CAD/CAM.

The GUI 100 is for example run on one user computer of the network, having a display and memory. For instance, GUIs similar to that identified by reference numeral 100 displayed in FIG. 1 may be run on other computers of the network. These computers may further benefit from similar local applications and a common environment.

Figure 8:
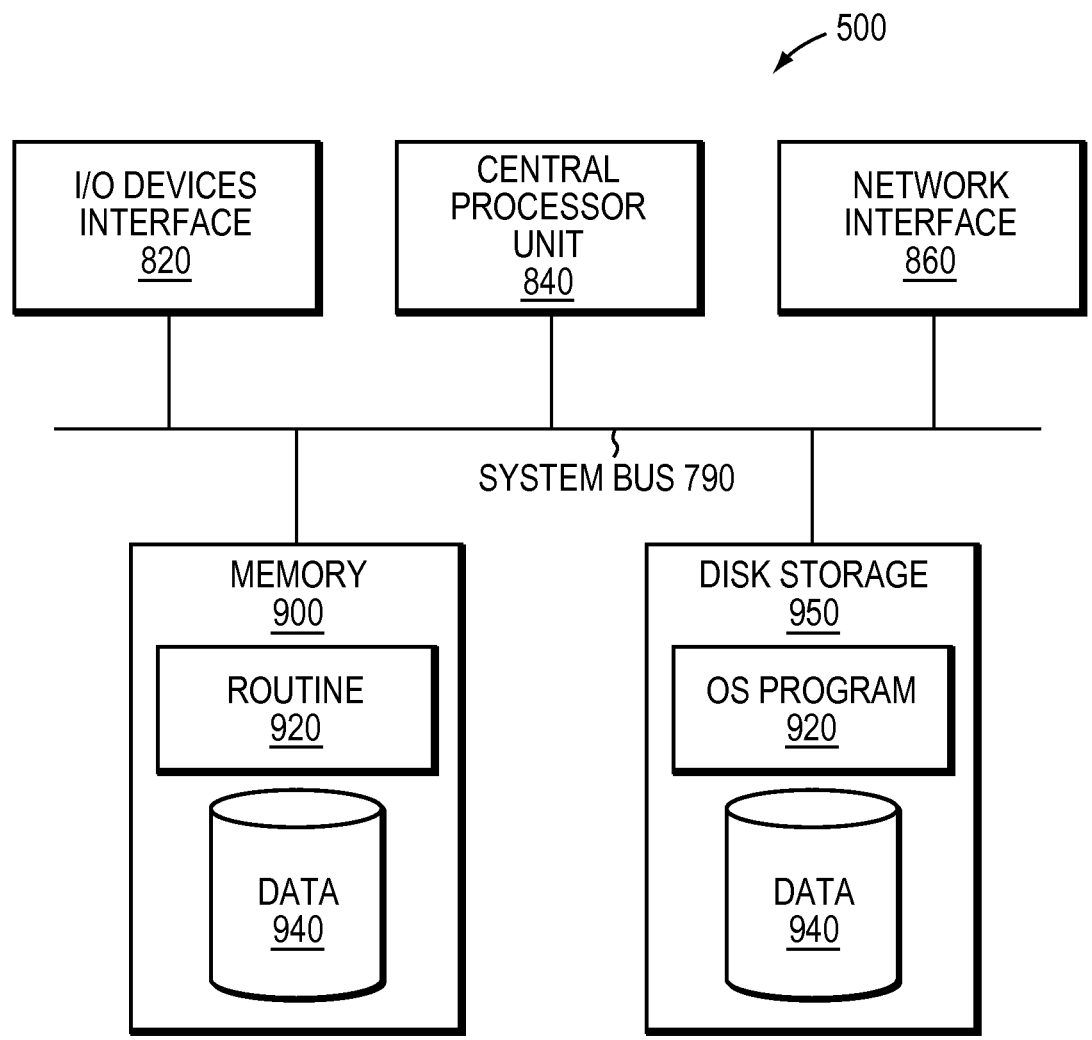
FIG. 8: a block diagram of a computer system embodying the present invention.

It is to be understood that the process described above can be applied to any object in any configuration capable of being defined by a CAD/CAM/CAE system, or any system used to display views of an object from varying viewpoints. The invention may be implemented in digital electronic circuitry, or in computer hardware, firmware, software, or in combinations of them as illustrated in computer system 500 of FIG. 8. Apparatus of the invention may be implemented in a computer program product 920 tangibly embodied in a machine-readable storage device 900, 950 for execution by a programmable processor 840; and method steps of the invention may be performed by a programmable processor 840 executing a program of instructions 920 to perform functions of the invention by operating on input data and generating output.

The invention may advantageously be implemented in one or more computer programs 920 that are executable on a system 500 including e.g. at least one programmable processor 840 coupled (via communication interfaces 860 and buses 790) to receive data 940 and instructions from, and to transmit data 940 and instructions to, a data storage system 900, 950, at least one input device (via 820), and at least one output device (via 820). The application program may be implemented in a high-level procedural or object-oriented programming language, or in assembly or machine language if desired; and in any case, the language may be a compiled or interpreted language.

Generally, a processor 840 will receive instructions 920 and data 940 from a read-only memory 950 and/or a random access memory 900. Storage devices suitable for tangibly embodying computer program instructions 920 and data 940 include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

While the present invention has been described merely in reference to interference specification, a person skilled in the art shall appreciate that the invention may be applied to objects (part, product) relations in a CAD system, not only to interference specifications.

While this invention has been particularly shown and described with references to example embodiments thereof, it will be understood by those skilled in the art that various changes in form and details may be made therein without departing from the scope of the invention encompassed by the appended claims.

What is claimed is:

1. A process of updating a status of interference between three-dimensional (3D) objects in a system of computer-aided design (CAD), for subsequent analysis of status of interference, comprising:
 in a processor:
 (a) identifying:
  a set of data of a group of 3D objects in a CAD model, each 3D object of the group being a part and the CAD model being a product;

a method of computation of interferences between objects in the CAD model, the computation being performed based on values; and an expected interference previously obtained as a result of executing the identified method using said set of data;

(b) executing the identified method using the set of data to compute a current interference between the same 3D objects;

(c) comparing the expected interference between the same 3D objects previously obtained with the current computed interference;

(d) updating a status of the expected interference between the same 3D objects based on a result of the comparing step;

(e) identifying a modified set of data, a computation method and/or an expected interference;

(f) repeating the steps of executing, comparing and updating; and (g) using the updated status in rendering the CAD model on a display monitor.

2. The process of claim 1, further comprising, after a step of identifying and prior to a step of executing the method, a step of:

creating or modifying an engineering intent object, wherein the engineering intent object maintains a logical link between an identified set of data, a computation method and an expected interference.

3. The process of claim 2, further comprising, after a step of creating or modifying the engineering intent object and prior to a step of executing the method, a step of:

storing the engineering intent object or a link thereto inside a definition of said group of objects.

4. The process of claim 2, wherein the step of comparing the expected interference with the computed interference is carried out according to the engineering intent object.

5. The process of claim 1, further comprising a step of:

displaying a status of an expected interference based on a result of the comparing step.

6. The process of claim 1, further comprising, prior to the step of identifying, a step of:

receiving user instructions to define or edit the set of data, the computation method and the expected interference.

7. The process of claim 1, wherein the steps of identifying, executing, comparing and updating are carried out during a design phase of the objects.

8. The process of claim 1, wherein the steps of identifying, executing, comparing and updating are carried out during a phase of clash analysis of the objects.

9. The process of claim 7, the process further comprising, during a subsequent phase of clash analysis of the objects, steps of:

identifying:

(i) a second set of data of a group of 3D objects in the CAD model, each 3D object of the group of the second set of data being a part and the CAD model being the product;

(ii) a second method of computation of interferences between objects in the CAD model, the computation being performed based on values; and (iii) a second expected interference previously obtained as a result of executing the second identified method;

executing the identified second method using the second set of data to compute a current interference between the second set of 3D objects;

comparing the second expected interference between the second set of 3D objects previously obtained with the second current computed interference; and updating a status of the second expected interference between the second set of 3D objects based on a result of the comparing step.

10. The process of claim 8, wherein a step of comparing comprises generating a comparison result, the comparison result being:

a first value if an expected interference matches a computed interference;

a second value if an expected interference does not match a computed interference; or a third value if a computed interference cannot be compared with an expected interference.

11. The process of claim 9, further comprising, a step of declaring a computed interference as a specification.

12. A computer program product, stored on a non-transitory computer readable media having computer readable program code embodied therewith, for updating a status of interference between three-dimensional (3D) objects in a system of computer-aided design (CAD), for subsequent analysis of status of interference, wherein the computer readable program code is configured to cause a computer onto which said computer program product is loaded to:

in a processor:

(a) identify:

a set of data of a group of 3D objects in a CAD model, each 3D object of the group being a part and the CAD model being a product;

a method of computation of interferences between objects in the CAD model, the computation being performed based on values; and an expected interference previously obtained of executing the method identified using said set of data;

(b) execute the identified method using the set of data to compute a current interference between the same 3D objects;

(c) compare the expected interference between the same 3D objects previously obtained with the current computed interference;

(d) update a status of the expected interference between the same 3D objects based on a result of the comparing of the expected interference with the computed interference;

(e) identify a modified set of data, a computation method and/or an expected interference; and (f) repeating the steps of executing, comparing and updating; and (g) using the updated status in rendering the CAD model on a display monitor.

13. The computer program product of claim 12, wherein said computer program product is further loaded to:

identify a modified set of data, a computation method and/or an expected interference; and repeat the execution, the comparison and the update.

14. The computer program product of claim 12, wherein said computer program product is further loaded to:

create or modify an engineering intent object, maintain a logical link between an identified set of data, a computation method and an expected interference.

15. The computer program product of claim 12, wherein said computer program product is further loaded to:

cause the computer to identify, execute, compare and update are carried out during a design phase of the objects;

wherein during a subsequent phase of clash analysis of the objects, the computer program product is further loaded to:

identify:
- (i) a second set of data of a group of 3D objects in the CAD model, each 3D object of the group of the second set of data being a part and the CAD model being the product;
- (ii) a second method of computation of interferences between objects in the CAD model, the computation being performed based on values; and
- (iii) a second expected interference previously obtained as a result of executing the second identified method;

execute the second identified method using the second set of data to compute a current second computed interference between the second set of 3D objects;

compare the second expected interference between the second set of 3D objects previously obtained with the current second computed interference, wherein comparing the second expected interference previously obtained with the current second computed interference comprises generating a comparison result, the comparison result being:

a first value if the current second expected interference matches the second computed interference;

a second value if the second expected interference does not match the current second computed interference; or a third value if the second computed interference cannot be compared with the current second expected interference;

update a status of the second expected interference between the second set of 3D objects based on a result of the comparing; and cause the computer to declare a computed interference as a specification.

16. A computerized apparatus for updating a status of interference between objects in a system of computer-aided design, for subsequent analysis of status of interference, comprising a computer processor, said computer processor configured to:

identify:
- a set of data of a group of 3D objects in a CAD model, each 3D object of the group being a part and the CAD model being a product;
- a method of computation of interference between objects, the computation being performed based on values; and
- an expected interference previously obtained of executing the method identified using said set of data;

execute the identified method using the set of data to compute a current interference between the same 3D objects;

compare the expected interference previously obtained with the current computed interference between the same 3D objects; and update a status of the expected interference between the same 3D objects based on a result of the comparing;

identify a modified set of data, a computation method and/or an expected interference;

repeat the steps of executing, comparing and updating; and use the updated status in rendering the CAD model on a display monitor.

17. The computerized apparatus of claim 16, wherein the computer processor is further configured to:

identify a modified set of data, a computation method and/or an expected interference; and repeat the execution, the comparison and the update.

18. The computerized apparatus of claim 16, wherein identifying, executing, comparing and updating are carried out during a design phase of the objects;

and wherein the computer processor is further configured to:

(a) during a subsequent phase of clash analysis of the objects:

identify:
- a second set of data of a group of 3D objects in the CAD model, each 3D object of the group of the second set of data being a part and the CAD model being the product;
- a second method of computation of interferences between objects in the CAD model, the computation being performed based on values; and
- a second expected interference previously obtained as a result of executing the second method identified;

execute the identified second method using the second set of data to compute a current interference between the second set of 3D objects;

compare the second expected interference between the second set of 3D objects previously obtained with the current second computed relation, wherein comparing the second expected interference previously obtained with the current second computed relation comprises generating a second comparison result, the second comparison result being:

a first value if the second expected interference match the second computed interference;

a second value if the second expected interference does not match the second computed interference; or a third value if the second computed interference cannot be compared with the second expected interference;

update a status of the second expected interference between the second set of 3D objects based on a result of the comparing; and (b) declare the second computed interference as a specification.

* * * * *